United States Patent [19]

Slaby

[11] Patent Number: 5,662,234
[45] Date of Patent: Sep. 2, 1997

[54] MOUNTING FOR FLUORESCENT LAMP BALLASTS

[75] Inventor: Jiri Slaby, Buffalo Grove, Ill.

[73] Assignee: Motorola, Inc., Schaumburg, Ill.

[21] Appl. No.: 592,078

[22] Filed: Jan. 26, 1996

[51] Int. Cl.[6] .................................................. B65D 6/24
[52] U.S. Cl. ........................ 220/4.21; 220/3.9; 220/3.8; 220/480; 220/3.92
[58] Field of Search .................................. 220/4.21, 4.26, 220/3.8, 3.9, 3.92, 3.94, 480, 481, 4.28

[56] References Cited

U.S. PATENT DOCUMENTS

| | | | |
|---|---|---|---|
| 1,672,683 | 6/1928 | Knoderer | 220/3.8 |
| 2,596,236 | 5/1952 | Glosier | 220/3.8 |
| 2,754,991 | 7/1956 | Hagerty et al. | 220/481 |
| 4,333,580 | 6/1982 | Sweigart, Jr. | 220/4.21 |
| 4,706,808 | 11/1987 | Guetersloh | 220/4.21 |
| 5,427,261 | 6/1995 | Naitou | 220/3.8 |
| 5,547,095 | 8/1996 | Sonntag et al. | 220/3.8 |

Primary Examiner—Stephen J. Castellano
Attorney, Agent, or Firm—Gary J. Cunningham; Kenneth L. Labudda

[57] ABSTRACT

A mounting for use with a ballast for powering one or more fluorescent lamps. The mounting includes a base (10), a back plate (12), and a lock structure comprising a male member (18) and a female member (20) for locking the base (10) to the back plate (12). The base (10) has at least one key (16) extending away from the base (10), and the back plate (12) has at least one key port (22) that is adapted to receive the key (16) and is configured to allow the key (16) to be positionally adjusted with respect to the back plate (12). In a preferred embodiment, the mounting has two keys (14, 16), two key ports (22, 28), and a cover (48).

18 Claims, 2 Drawing Sheets

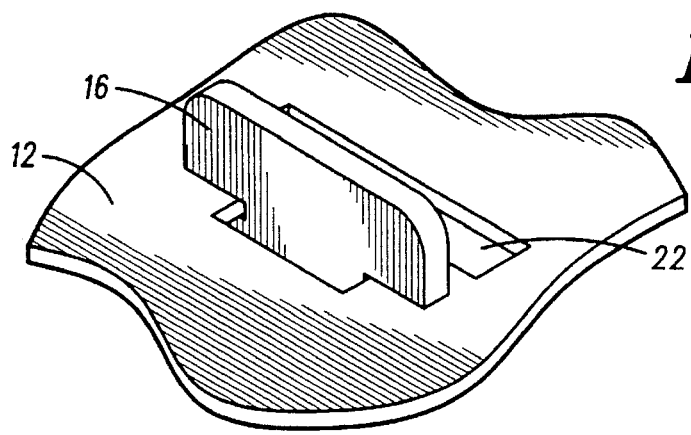
FIG.2
FIG.3A
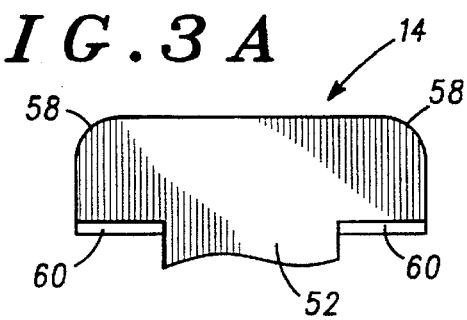
FIG.3B
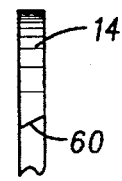
FIG.4
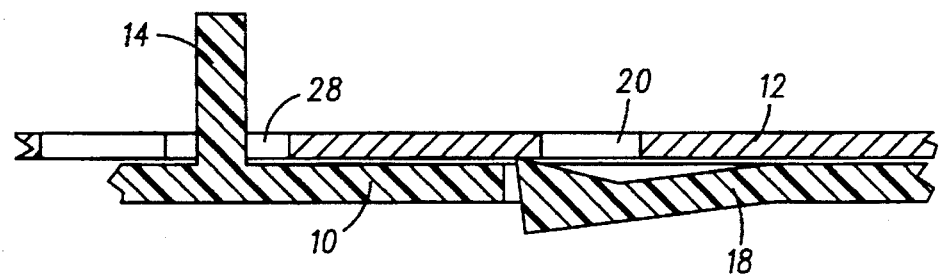
FIG.5
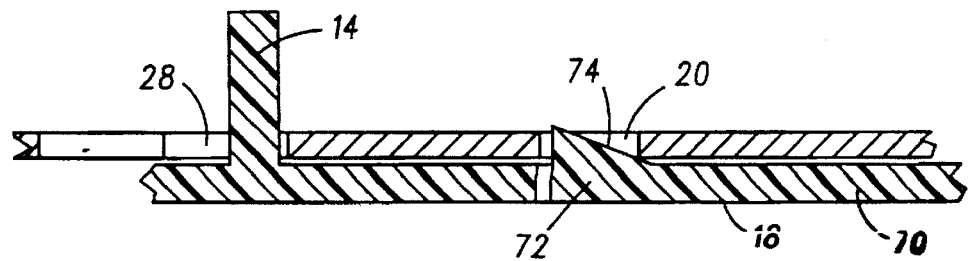

MOUNTING FOR FLUORESCENT LAMP BALLASTS

FIELD OF THE INVENTION

The present invention relates to the general subject of packages and mountings and, in particular, to a mounting for fluorescent lamp ballasts.

BACKGROUND OF THE INVENTION

One of the necessary steps in the manufacture or retrofit of fluorescent lighting systems is the installation and/or removal of a ballast in a lighting fixture or junction box. Typically, ballast installation involves two distinct tasks — electrical wiring and physical mounting of the ballast package.

Existing methods for mounting a ballast within a lighting fixture or junction box include the simple "hardware" approach, in which the ballast package contains flanges on opposing ends and the ballast is mounted to the fixture using simple screws or nuts and bolts, and the "snap-on" method, in which the base of the ballast enclosure contains small projections which snap into holes in the fixture or junction box. The hardware approach is undesirable due to the amount of time and effort, as well as the additional hardware and tools, that are required. The snap-on method, while much less labor intensive than the hardware approach and quite attractive due to its simplicity and apparent elimination of the need for additional hardware or tools, has proven to be highly unreliable from a mechanical standpoint and is not at all amenable to repeated installation and removal of the same ballast.

It is therefore apparent that a ballast mounting which eliminates the need for additional hardware and tools, which minimizes the time and effort required for installation and removal, and which provides a reliable, secure, and repeatable mounting of the ballast package, would constitute a considerable improvement over the prior art.

BRIEF DESCRIPTION OF THE DRAWINGS

FIG. 2 shows a key of the base inserted into a key port of the back plate, in accordance with the present invention.

FIG. 3A shows a front-view of a key, and FIG. 3B shows a left-side view of the key, in accordance with the present invention.

FIG. 4 shows a left-side view of a lock structure prior to interconnection of a male member of the base with a female member of the back plate, in accordance with the present invention.

FIG. 5 shows a left-side view of the lock structure shown in a locked position interconnecting a male member of the base with a female member of the back plate, in accordance with the present invention.

DETAILED DESCRIPTION OF A PREFERRED EMBODIMENT

Figure 1:
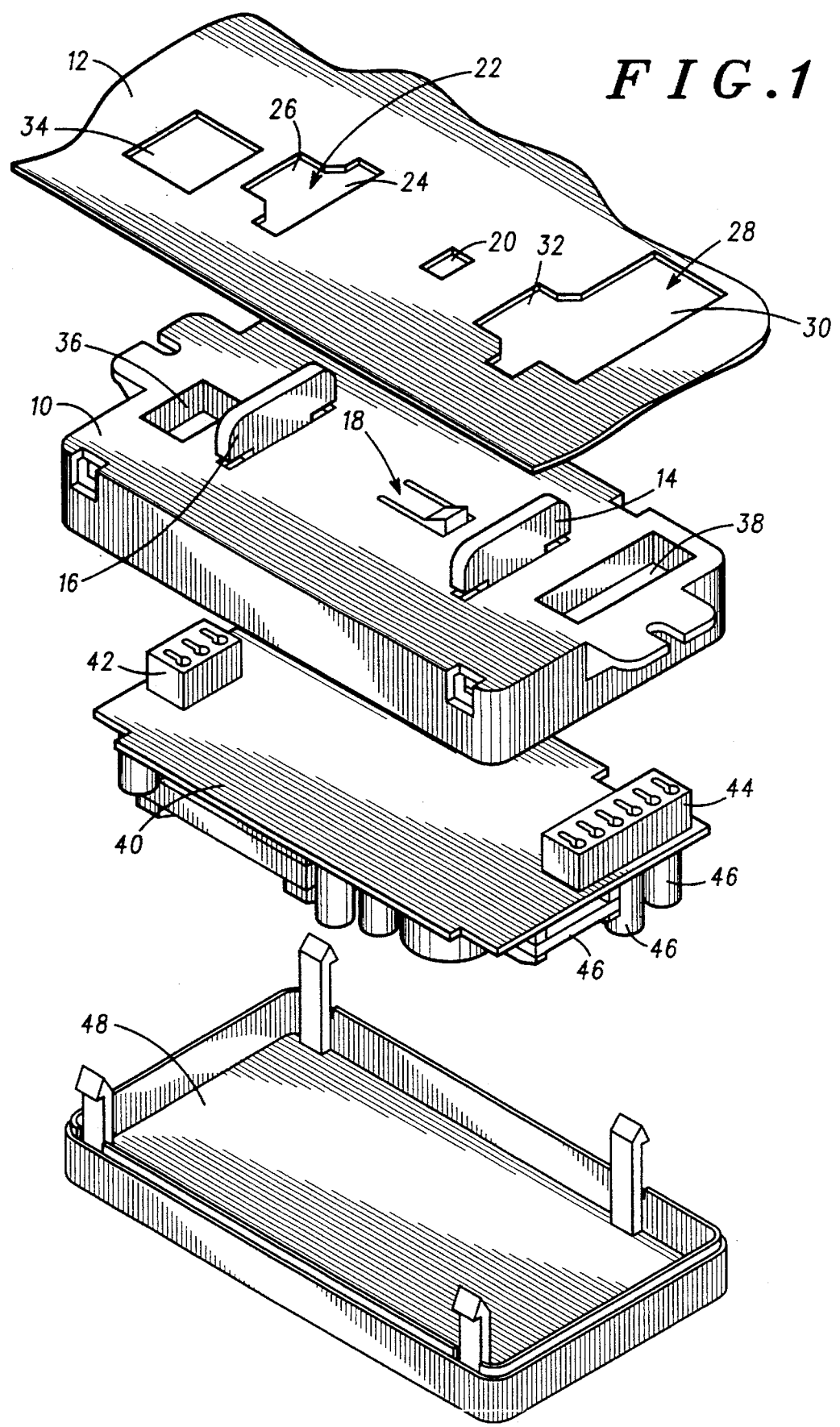
FIG. 1 is an exploded elevational view of a ballast mounting comprising a back plate, a base, a populated circuit board, and a cover, in accordance with the present invention.

A ballast mounting is shown in FIG. 1. In its most basic form, the ballast mounting comprises a base 10, a back plate 12, and a lock structure for locking the base 10 to the back plate 12. The base 10 has at least one key 16 that extends away from the base 10, and the back plate 12 has at least one key port 22 that is adapted to receive the key 16 and that is configured to allow the key 16 to be positionally adjusted with regard to the back plate 12. As the back plate 12 is attached to a lighting fixture or junction box prior to ballast installation, this mounting allows one to quickly, reliably, and securely mount a ballast to an appropriate fixture without the need for tools or hardware.

In a preferred embodiment substantially as shown in FIG. 1, the base 10 has two keys 14, 16 that are rigidly connected to the base 10, and the back plate 12 has two key ports 28, 22. The mounting also includes a cover 48 that is adapted to be securely connected to the base 10, the base 10 and the cover 48 together defining a housing that is adapted to receive a circuit board 40. The circuit board 40 is populated with electrical components 46 that are operable to drive at least one fluorescent lamp. The circuit board 40 also contains an input connector 42 and an output connector 44, and the base 10 and the back plate 12 each include an input connector port and an output connector port. Specifically, the base 10 includes a base input connector port 36 and a base output connector port 38, and the back plate 12 includes a back plate input connector port 34 and, although not explicitly identified in the figures, a back plate output connector port. Note that, in the embodiment described by FIG. 1, the back plate output connector port does not exist as a separate entity but is integrated with key port 28. Back plate input connector port 34 and key port 28 are oversized to accommodate the input connector 42 and output connector 44 while at the same time allowing for positional adjustment of the base 10 and the keys 14, 16 with regard to the back plate 12.

The insertion and positioning of each key with regard to its corresponding key port is illustrated in FIG. 2. Referring to FIG. 3A, each key 14, 16 includes an anchor portion 50 and a neck portion 52. The anchor portion 50 comprises a distal portion and a proximal portion, the distal portion including chamfered outer portions 58 for facilitating insertion into the key port 22, and the proximal portion including inclined surfaces 60 for facilitating a sliding motion by which the key is positionally adjusted with respect to the back plate 12.

Referring again to FIG. 1, the structure of each key port 22, 28 is described by way of example using key port 22, which comprises a first portion 24 and a second portion 26. The first portion 24 is complementarily configured with respect to key 16 to receive the anchor portion 50 of key 16. The second portion is configured to receive the neck portion 52 of key 16.

In a preferred embodiment, the lock structure comprises a male member 18 of the base and a female member 20 of the back plate. As shown in FIGS. 4 and 5, the male member 18 interconnects with the female member 20 when the base 10 is suitably positioned with respect to the back plate 12. In order to accommodate the moderate latitudinal deformation which occurs prior to interconnection with the female member 20, the male member 18 is latitudinally flexible with respect to the base 10, as shown in FIG. 4. The male member 18 includes a longitudinally extending portion 70 that is substantially parallel to a surface of the base 10, and terminates with a latitudinally extending portion 72 that is substantially perpendicular to the surface of the base 10. The latitudinally extending portion 72 includes a sloped portion 74 which facilitates a sliding motion prior to interconnection with the female member 20.

Referring again to FIG. 1, the assembled ballast comprises the circuit board 40, the base 10, and the cover 48.

Circuit board 40 is populated with electrical components 46, as well as input connector 42 and output connector 44. The base 10, back plate 12, and cover 48 may be composed of any of a variety of materials, including metals and plastics. In one embodiment, the base 10 and cover 48 are composed of a molded plastic material, while the back plate 12 is composed of galvanized steel.

The back plate 12 is mounted to a fluorescent lighting fixture or junction box, either as part of the fixture or junction box manufacturing process or at any point prior to ballast installation. The assembled ballast is then securely attached to the fixture-mounted back plate 12 as follows. The ballast is moved latitudinally such that keys 14, 16 are fully inserted into the first portions 30, 24 of key ports 28, 26, respectively, at which point further latitudinal movement is prohibited by virtue of a surface of the base 10 butting against a surface of the back plate 12. At the same time, the latitudinally extending portion 72 of the male member 18 of the lock structure is likewise in contact with the surface of back plate 12, causing a temporary latitudinal deformation in the longitudinally extending portion 70. Next, the ballast is slid in a longitudinal direction such that the keys 14, 16 are moved from the first portions 30, 24 into the second portions 32, 26 of key ports 28, 26, respectively. Simultaneously, the latitudinally extending portion 72 of the male member 18 of the lock structure is moved toward the female member 20. Upon completion of the longitudinal sliding motion, further sliding being prohibited by the anchor portion 52 of each key 14, 16 butting up against an outside edge of its respective key port, the latitudinally extending portion 72 becomes seated inside of female member 20, as shown in FIG. 3.

In order to dismount the ballast from the back plate 12, one must push down upon the latitudinally extending member 72, which results once again in a latitudinal deformation in the longitudinally extending portion 70. Simultaneously, while pushing down upon member 72, the ballast must be slid in a longitudinal direction such that the keys 14, 16 are moved from the second portions 32, 26 into the first portions 30, 24 of key ports 28, 26, respectively. This being done, all that remains in the dismounting process is to move the ballast in a latitudinal direction such that the keys 14, 16 are entirely removed from key ports 28, 26.

The disclosed ballast mounting offers several advantages over existing practices for ballast installation and replacement. First of all, as the back plate is attached to the fixture beforehand, and the base and back plate are designed to mate with each other, no additional hardware or special tools are required in order to securely mount the ballast inside of the fixture. This greatly reduces the time and effort involved in ballast installation or replacement. Furthermore, the disclosed combination of keys and a locking structure provides for a very reliable and secure ballast mounting which is very easy to properly install and which is highly resistant to failures which might arise due to drop shock, vibration, or repeated installation and removal of the same ballast.

Although the present invention has been described with reference to a certain preferred embodiment, numerous modifications and variations can be made by those skilled in the art without departing from the novel spirit and scope of this invention.

What is claimed is:

1. A ballast mounting comprising:
    a housing including a base having at least one key extending away from the base;
    a back plate having at least one key port adapted to receive the key and configured to allow the key to be positionally adjusted with respect to the back plate;
    a lock structure for locking the base of the housing to the back plate; and
    wherein the back plate has two key ports, the two key ports being substantially different in shape.

2. A ballast mounting comprising:
    a housing including a base having at least one key extending away from the base;
    a back plate having at least one key port adapted to receive the key and configured to allow the key to be positionally adjusted with respect to the back plate;
    a lock structure for locking the base of the housing to the back plate;
    wherein the key port comprises a first portion and a second portion, the first portion being substantially complementarily configured to receive an anchor portion of the key, the second portion being substantially complementarily configured to receive a neck portion of the key; and
    wherein the anchor portion includes a distal portion and a proximal portion, the distal portion including chamfered outer portions for facilitating insertion into the key port, and the proximal portion including an inclined surface for facilitating a sliding motion by which the key is positionally adjusted with respect to the back plate.

3. The mounting of claim 2, further comprising a cover adapted to be substantially securely connected to the base.

4. The mounting of claim 2, wherein the base is adapted to receive a circuit board.

5. The mounting of claim 2, wherein the base is adapted to receive components operable to drive at least one fluorescent lamp.

6. The mounting of claim 2, wherein the key is substantially rigidly connected to the base.

7. The mounting of claim 2, wherein the base and the back plate each include an input connector port and an output connector port.

8. The mounting of claim 2, wherein the lock structure comprises a male member of the base and a female member of the back plate, wherein the male member interconnects with the female member when the base is suitably positioned with respect to the back plate.

9. The mounting of claim 8, wherein the male member comprises a structure that is substantially latitudinally flexible with respect to the base.

10. The mounting of claim 8, wherein the male member includes a longitudinally extending portion that is substantially parallel to a surface of the base, the male member terminating with a latitudinally extending portion that is substantially perpendicular to the surface of the base.

11. The mounting of claim 10, wherein the latitudinally extending portion includes a sloped portion.

12. The mounting of claim 10, wherein the latitudinally extending potion is adapted to be received by the female member of the lock structure.

13. A mounting for use with a ballast for powering at least one fluorescent lamp, the mounting comprising:
    a housing including a base and a cover, the base having at least one key extending away from the base, the cover being adapted to be substantially securely connected to the base, the key being substantially rigidly connected to the base;
    a back plate having at least one key port adapted to receive the key and configured to allow the key to be positionally adjusted with respect to the back plate, the key port comprising a first portion and a second portion, the first portion being substantially complementarily configured to receive an anchor portion of the key, the second portion being substantially complementarily configured to receive a neck portion of the key, the anchor portion including a distal portion and a proximal portion, the distal portion including chamfered outer portions for facilitating insertion into the key port, and the proximal portion including inclined surfaces for facilitating a sliding motion by which the key is positionally adjusted with respect to the back plate; and a lock structure for locking the base of the housing to the back plate, the lock structure comprising a male member of the base and a female member of the plate, the male member interconnecting with the female member when the base is suitably positioned with respect to the plate, the male member including a longitudinally extending portion that is substantially parallel to a surface of the base, the male member terminating with a latitudinally extending portion that is substantially perpendicular to the surface of the base, the latitudinally extending portion including a sloped portion that is adapted to be received by the female member of the lock structure, the male member comprising a structure that is substantially latitudinally flexible with respect to the base.

14. The mounting of claim 13, wherein the housing is adapted to receive a circuit board.

15. The mounting of claim 13, wherein the housing is adapted to receive components operable to drive at least one fluorescent lamp.

16. The mounting of claim 13, wherein the base has two keys and the back plate has two key ports for receiving the keys.

17. The mounting of claim 13, wherein the base and the back plate each include an input connector port and an output connector port.

18. A mounting for use with a ballast for powering at least one fluorescent lamp, the mounting comprising:

a housing including a base and a cover, the base having two keys extending away from the base, the cover being adapted to be substantially securely connected to the base, the keys being substantially rigidly connected to the base, the housing being adapted to receive a circuit board including components operable to drive at least one fluorescent lamp;

a back plate having two key ports adapted to receive the keys and configured to allow the keys to be positionally adjusted with respect to the back plate, each key port comprising a first portion and a second portion, the first portion being substantially complementarily configured to receive an anchor portion of the key, the second portion being substantially complementarily configured to receive a neck portion of the key, the anchor portion including a distal portion and a proximal portion, the distal portion including chamfered outer portions for facilitating insertion into the key port, and the proximal portion including inclined surfaces for facilitating a sliding motion by which the key is positionally adjusted with respect to the back plate;

the base and the back plate each including an input connector port and an output connector port; and a lock structure for locking the base of the housing to the back plate, the lock structure comprising a male member of the base and a female member of the back plate, the male member comprising a structure that is substantially latitudinally flexible with respect to the base, the male member interconnecting with the female member when the base is suitably positioned with respect to the back plate, the male member including a longitudinally extending portion substantially parallel to a surface of the base, the male member terminating with a latitudinally extending portion that is substantially perpendicular to the surface of the base, the latitudinally extending portion including a sloped portion that is adapted to be received by the female member of the lock structure.

* * * * *